(12) United States Patent
Singleton

(10) Patent No.: US 6,505,646 B1
(45) Date of Patent: Jan. 14, 2003

(54) PRESSURE REDUCTION VALVE FOR A COMPRESSIBLE FLUID

(75) Inventor: Edward Whiteley Singleton, Brighouse (GB)

(73) Assignee: Kent Introl Limited, West Yorkshire (GB)

( * ) Notice: Subject to any disclaimer, the term of this patent is extended or adjusted under 35 U.S.C. 154(b) by 0 days.

(21) Appl. No.: 09/762,603
(22) PCT Filed: Aug. 16, 1999
(86) PCT No.: PCT/GB99/02702
§ 371 (c)(1),
(2), (4) Date: Jun. 4, 2001
(87) PCT Pub. No.: WO00/09917
PCT Pub. Date: Feb. 24, 2000

(30) Foreign Application Priority Data

Aug. 14, 1998 (GB) ............................................ 98176423

(51) Int. Cl.[7] .................................................. F16K 3/24
(52) U.S. Cl. ................................ 137/625.3; 137/625.33
(58) Field of Search .......................... 137/625.3, 625.33

(56) References Cited

U.S. PATENT DOCUMENTS

| 3,776,278 A | 12/1973 | Allen |
| 3,971,415 A | 7/1976 | Föller |
| 4,041,982 A | 8/1977 | Lindner |
| 4,384,593 A | * 5/1983 | Keller .................... 137/630.15 |
| 4,397,331 A | * 8/1983 | Medlar ........................ 137/375 |
| 4,762,146 A | * 8/1988 | Ewbank et al. .......... 137/625.3 |
| 5,014,746 A | * 5/1991 | Heymann ................. 137/625.3 |
| 5,020,571 A | 6/1991 | Tartaglia et al. |

FOREIGN PATENT DOCUMENTS

| EP | 0 167 252 A1 | 1/1986 |
| EP | 0 525 688 A1 | 3/1993 |
| FR | 2187083 | 1/1974 |
| WO | WO 00/09917 | 2/2000 |

* cited by examiner

Primary Examiner—John Fox
(74) Attorney, Agent, or Firm—Jan K. Simpson; Diana M. Sangalli; Fulbright & Jaworski

(57) ABSTRACT

A pressure reduction valve for a compressible fluid has an inlet and outlet separated by a pressure reduction member having a plurality of convergent-divergent nozzles High pressure gas or vapour passes from the valve inlet through the nozzles which control the expansion of the gas/vapour to a reduced pressure and eliminate shock waves. The gas/vapour expands into an intermediate attenuation chamber in which the resulting turbulence is confined before the gas/vapour passes through the diffuser into the outlet such that the diffused streams do not interact. The invention provides for pressure reduction with significantly reduced noise levels.

7 Claims, 2 Drawing Sheets

PRESSURE REDUCTION VALVE FOR A COMPRESSIBLE FLUID

The present invention relates to a pressure reduction valve for a compressible fluid.

Pressure reduction valves for reducing the pressure of a fluid i.e. a gas, liquid or vapour are well known. One such example, described in our UK Patent No. 1405850, has a pressure reduction member disposed between the inlet and outlet chambers of a valve. The pressure reduction member comprises a plurality of concentric spaced sleeves each being penetrated by radial passages. High pressure fluid enters the inlet, passes through radial passages in a first sleeve and then expands into an annular clearance between sleeves to result in a reduction of fluid pressure. This process is repeated several times through successive sleeves until the fluid reaches the outlet at low pressure.

Existing pressure reduction valves have the disadvantage of requiring a number of expensive control elements. Each element, does of itself generate some noise, but the overall effect is a reduction in noise level due to the reduction in fluid velocity which reduces or eliminates shock waves.

In view of increasing concern for the environment reflected in pending legislation, it is desirable to reduce objectionable noise and to be able to achieve this in the most economical manner.

U.S. Pat. No. 4,041,982 describes a control valve with a double-walled pressure reduction cage. The cage has a pair of perforated cylindrical walls spaced apart in a concentric relationship. A reciprocal valve plug is disposed between the walls to control the fluid flow though the valve. The perforations in the cylinders are of constant diameter and provide a two-stage reduction. Further reduction in pressure occurs during free expansion of the fluid outside of the cage, such expansion will include shock waves.

It is an object of the present invention to provide for a pressure reduction valve that brings about a reduction in noise normally generated by a fluid when undergoing pressure reduction and to achieve this without resorting to numerous sleeves or large diameter discs forming tortuous paths.

According to the present invention there is provided a pressure reduction valve for a compressible fluid, the valve comprising an inlet and outlet separated by a pressure reduction member having a plurality of nozzles, a diffuser, an attenuation chamber intermediate the pressure reduction member and the diffuser, and a plug that is movable to close one or more nozzles so as to control the amount of flow of the compressible fluid from the inlet to the outlet characterised in that the nozzles are convergent-divergent nozzles in the direction of flow of the compressible fluid, and that the attenuation chamber is disposed downstream of the plug, so that its volume is sufficient for attenuating the noise from the turbulence of jets of compressible fluid emergent from the nozzles independently of the position of the plug.

High pressure gas or vapour passes from the valve inlet through the nozzles which control the expansion of the gas/vapour to a reduced pressure and eliminate shock waves. The gas/vapour expands into the intermediate attenuation chamber in which the resulting turbulence is confined before the gas/vapour passes through the diffuser into the outlet such that the diffused streams do not interact.

Preferably the pressure reduction member and the diffuser are concentric cylinders spaced apart to define the intermediate attenuation chamber.

The nozzles may be arranged in axially spaced circumferential rows.

The plug may be axially slidable along an inner surface of the pressure reduction member.

A specific embodiment of the present invention will now be described, by way of example only, with reference to the accompanying drawings in which.

Figure 1:
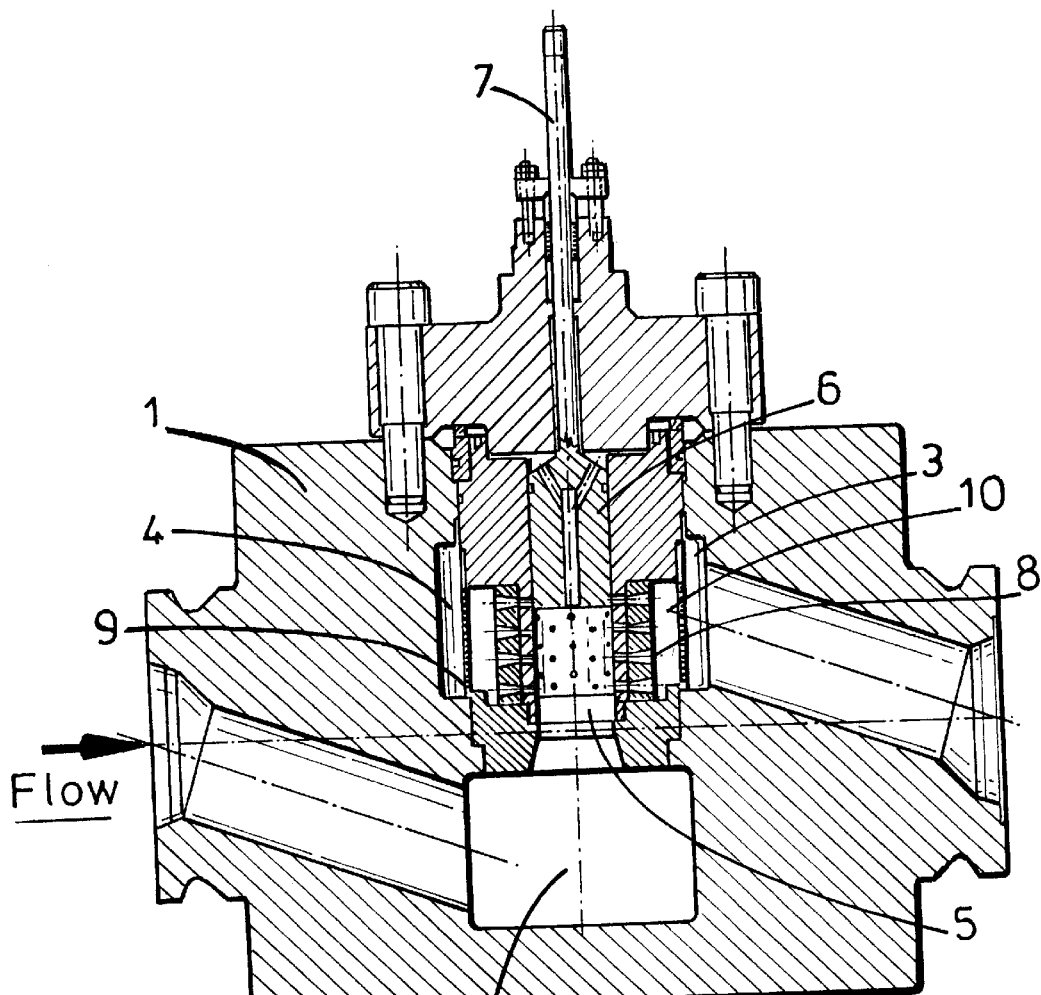
FIG. 1 is a longitudinal section of a pressure reduction valve for a compressible fluid in accordance with the present invention.
Figure 2:
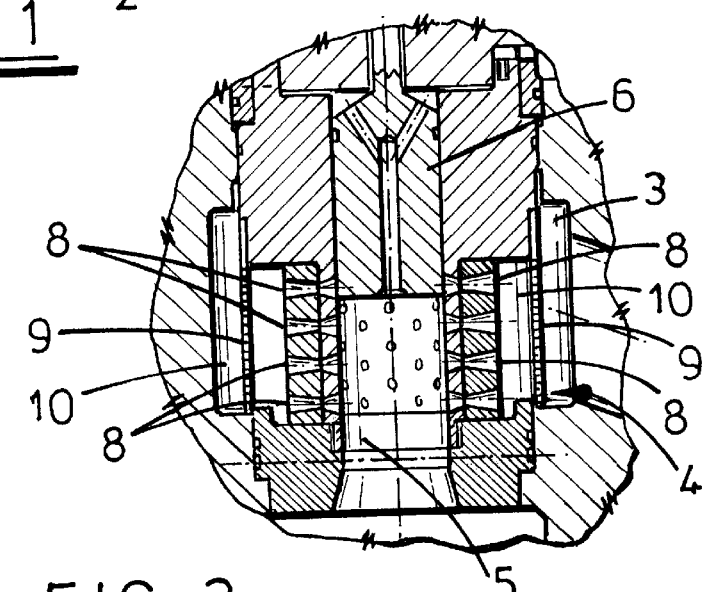
FIG. 2 is an enlarged view of a pressure reduction member of the valve of FIG. 1.
Figure 3:
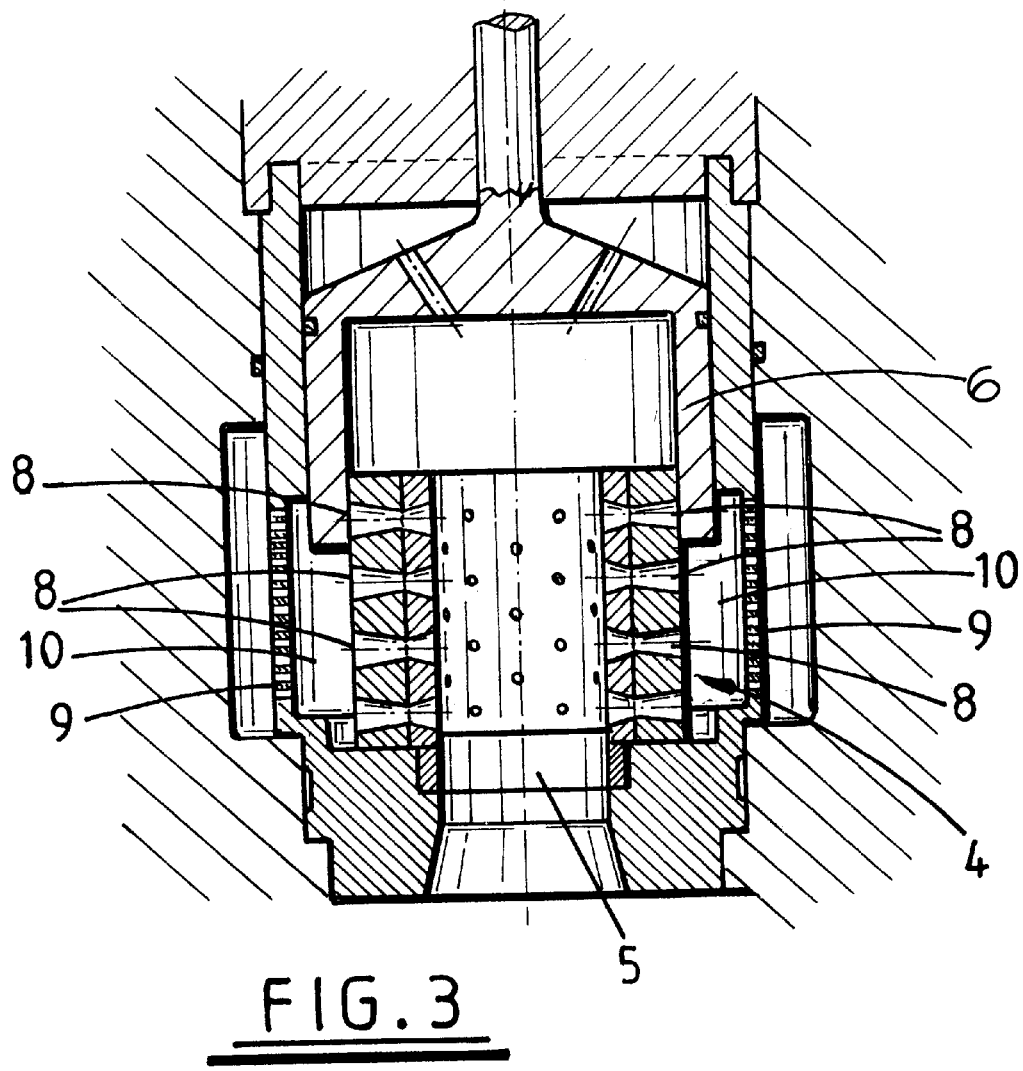
FIG. 3 is a longitudinal section of a pressure reduction valve for a compressible fluid in accordance with an alternative embodiment of the invention.

Referring now to the drawings, valve comprises a housing 1 having an inlet chamber 2 and an outlet chamber 3 separated by a hollow cylindrical pressure reduction member 4.

The pressure reduction member 4 has a central passage 5 that is closable by an axially slidable plug 6 having an elongate stem 7 that extends out of the housing 1 and is connected to any suitable actuator (not shown).

At an end nearest the inlet chamber 2 the pressure reduction member 4 is radially inwardly stepped and is penetrated radially by a plurality of convergent-divergent nozzles 8 that are arranged in axially spaced circumferential rows.

Radially outboard of the nozzles 8 is a cylindrical diffuser 9 that is spaced from the nozzles 8 so as to define an intermediate closed annular attenuation chamber 10.

In operation, high pressure gas or vapour enters the inlet chamber 2 of the valve and, if the plug 6 is raised so as to expose the nozzles 8, expands in a controlled manner through the nozzles 8 to the desired outlet pressure. The convergent-divergent configuration of the nozzles 8 allows fully controlled expansion of the gas/vapour and thus eliminates shock waves and the associated noise in supercritical expansion. The gas or vapour egresses from the nozzles 8 at a high velocity and is turbulent. However, the turbulence is contained within the attenuation chamber 10 from which the fluid can flow into the outlet chamber 3 only through the diffuser 9 which has sufficient flow area to impart negligible pressure drop to the gas/vapour. The emergent streams of gas/vapour have a relatively low velocity and are spaced so that they do not interact.

The noise from the turbulence of the high velocity jets of gas/vapour emergent from the nozzles is not as significant as that from shock waves and in any event is attenuated considerably by the attenuation chamber 10 and diffuser 9 before it emerges from the valve outlet chamber 3.

It will be appreciated that numeral modifications to the above described design may be made without departing from the scope of the invention as defined in the appended claims. For example, the nozzles 8 may be arranged so that they are spaced apart in a helical configuration on the circumference of the pressure reduction member. Moreover, in an alternative embodiment the plug may be designed so as to be axially slidable over the outer surface of the pressure reduction member. In a further modified embodiment the diffuser 9 may be supplemented by additional diffusers if required. Finally, the entrance to the central passage 5 may include a filter to project the valve from foreign bodies contained in the fluid.

What is claimed is:

1. A pressure reduction valve for a compressible fluid, the valve comprising an inlet (2) and outlet (3) separated by a pressure reduction member (4) having a plurality of nozzles (8), a diffuser, an attenuation chamber (10) intermediate the pressure reduction member and the diffuser (9), and a plug (6) that is movable to close one or more nozzles so as to control the amount of flow of the compressible fluid from the inlet (2) to the outlet (3) characterised in that the nozzles (8) are convergent-divergent nozzles in the direction of flow of the compressible fluid, and that the attenuation chamber (10) is disposed downstream of the plug (6), so that its volume is sufficient for attenuating the noise from the turbulence of jets of compressible fluid emergent from the nozzles (8) independently of the position of the plug (6).

2. A pressure reduction valve according to claim 1, wherein the pressure reduction member (4) and the diffuser (9) are concentric cylinders spaced apart to define the intermediate attenuation chamber (10).

3. A pressure reduction valve according to claim 2, wherein the nozzles (8) are arranged in axially spaced circumferential rows.

4. A pressure reduction valve according to claim 2, wherein the nozzles (8) are arranged in helically spaced circumferential rows.

5. A pressure reduction valve according to any preceding claim, wherein the plug (6) is axially slidable along an inner surface of the pressure reduction member (4).

6. A pressure reduction valve according to claim 1, wherein the plug (6) is axially slidable along an outer surface of the pressure reduction member (4).

7. A pressure reduction valve according to claim 1, wherein the pressure reduction valve comprises only one pressure reduction member (4).

* * * * *